US009986066B2

(12) United States Patent
Kunieda et al.

(10) Patent No.: US 9,986,066 B2
(45) Date of Patent: May 29, 2018

(54) COLLECTIVE OUTPUT SYSTEM, COLLECTIVE OUTPUT METHOD AND TERMINAL DEVICE

(71) Applicants: Takayuki Kunieda, Kanagawa (JP); Shogo Hyakutake, Kanagawa (JP); Hideaki Kitagawa, Tokyo (JP); Yuji Morioka, Hokkaido (JP)

(72) Inventors: Takayuki Kunieda, Kanagawa (JP); Shogo Hyakutake, Kanagawa (JP); Hideaki Kitagawa, Tokyo (JP); Yuji Morioka, Hokkaido (JP)

(73) Assignee: RICOH COMPANY, LTD., Tokyo (JP)

( * ) Notice: Subject to any disclaimer, the term of this patent is extended or adjusted under 35 U.S.C. 154(b) by 195 days.

(21) Appl. No.: 14/332,527

(22) Filed: Jul. 16, 2014

(65) Prior Publication Data
US 2015/0026295 A1    Jan. 22, 2015

(30) Foreign Application Priority Data

Jul. 19, 2013 (JP) .................................. 2013-151153

(51) Int. Cl.
*G06F 15/16* (2006.01)
*H04L 29/06* (2006.01)
*H04L 29/08* (2006.01)

(52) U.S. Cl.
CPC .............. *H04L 67/38* (2013.01); *H04L 67/08* (2013.01)

(58) Field of Classification Search
CPC ........................... H04L 67/10; G06F 17/30879
(Continued)

(56) References Cited

U.S. PATENT DOCUMENTS

2003/0017823 A1 *  1/2003  Mager ................... H04M 1/22
                                                    455/414.1
2008/0129825 A1 *  6/2008  DeAngelis ......... A63B 24/0021
                                                    348/169
(Continued)

FOREIGN PATENT DOCUMENTS

JP        2012-108872         6/2012

*Primary Examiner* — Wing F Chan
*Assistant Examiner* — Andrew Woo
(74) *Attorney, Agent, or Firm* — Oblon, McClelland, Maier & Neustadt, L.L.P.

(57) ABSTRACT

A collective output system includes an information processing device and a plurality of terminal devices. The information processing device holds content containing multiple elements in association with time information, generates a map that associates each piece of position information with each of the elements, receives output position information from a terminal device, acquires, on the basis of the map, an element associated with the position information corresponding to the output position information, acquires the time information associated with the content, and transmits the element and the time information to the terminal. Each of the terminal devices acquires the output position information, transmits the output position information to the information processing device, receives the element and the time information that are transmitted from the information processing device according to the transmitted output position information, and outputs the element at the timing indicated by the time information.

15 Claims, 13 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2008/0267504 A1* | 10/2008 | Schloter | G06F 17/30879 382/181 |
| 2012/0098733 A1 | 4/2012 | Masuda et al. | |
| 2013/0138518 A1* | 5/2013 | White | G06Q 20/204 705/16 |
| 2013/0246576 A1* | 9/2013 | Wogsberg | H04N 7/181 709/219 |
| 2014/0203071 A1* | 7/2014 | Eggert | G06F 17/30002 235/375 |

* cited by examiner

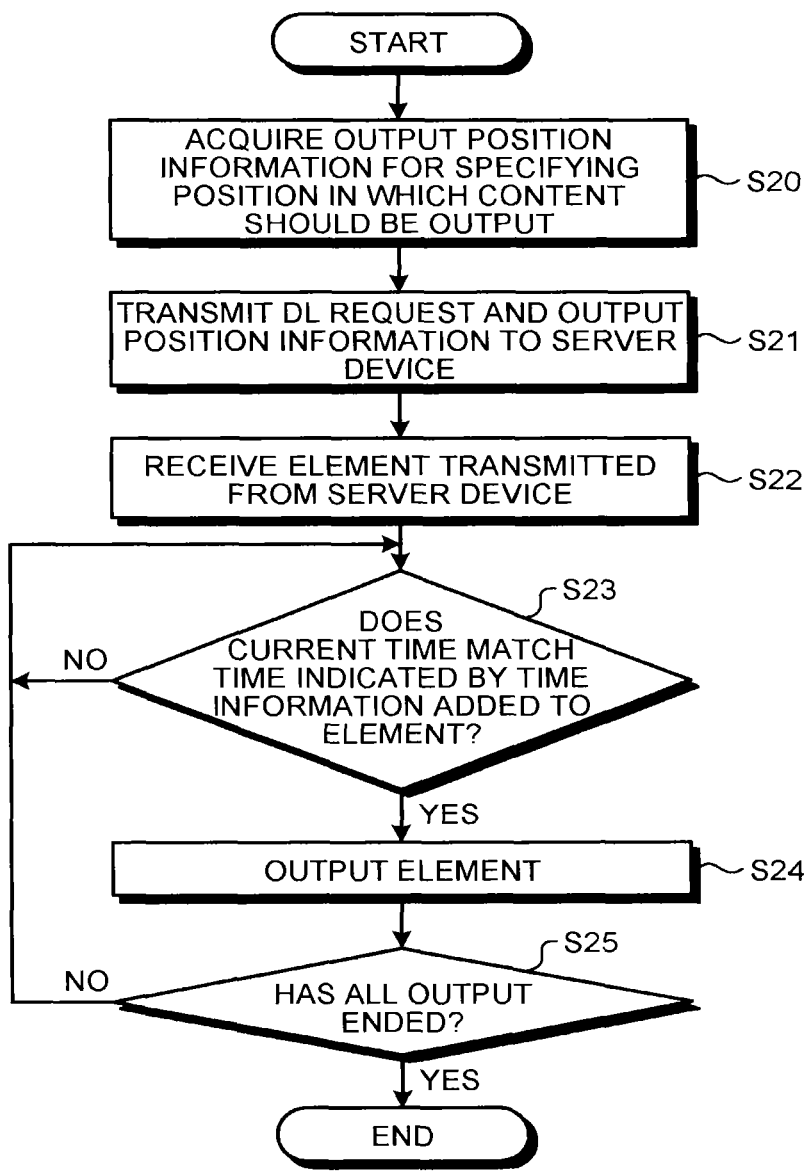

US 9,986,066 B2

COLLECTIVE OUTPUT SYSTEM, COLLECTIVE OUTPUT METHOD AND TERMINAL DEVICE

CROSS-REFERENCE TO RELATED APPLICATION(S)

The present application claims priority to and incorporates by reference the entire contents of Japanese Patent Application No. 2013-151153 filed in Japan on Jul. 19, 2013.

BACKGROUND OF THE INVENTION

1. Field of the Invention

The present invention relates to a collective output system, a collective output method and a terminal device.

2. Description of the Related Art

Screen sharing systems have been developed in which the same content is displayed on multiple information processing devices and operations on the displayed content can be shared (Japanese Laid-open Patent Publication No. 2012-108872). Such a screen sharing system makes it possible to switch the content displayed on many information processing devices at the same time with an input operation performed on just one of the information processing devices.

There are conventional performances (referred to as a card stunt) in which, in large stadiums, etc., the audience in their seats change the content of their cards in synchronization with each other to create a given figure with many cards. Because it is possible to create a figure using all of the audience seats, for example, support at a game can be effectively given. Furthermore, because it is possible to create a huge figure with all of the audience seats, a TV audience can easily recognize the figure when the game is broadcast on TV.

The information that can be displayed with the cards that are used at such a card stunt is limited and it is difficult to make a variety of expressions. Furthermore, at a card stunt, when changing from one displayed figure to another, it is necessary for the people who have the cards to move the cards in accordance with some signal and it is difficult to synchronize the actions of the audience. For this reason, it is difficult to switch the figure quickly at a card stunt.

In contrast, the technology according to Japanese Laid-open Patent Publication No. 2012-108872 makes it easy to synchronize switching of many images, which in turn makes it easy to quickly switch the displayed content in sequence. Furthermore, according to Japanese Laid-open Patent Publication No. 2012-108872, images are displayed with information processing devices so that many more images can be switched and displayed. However, because common content is displayed across many information processing devices according to Japanese Laid-open Patent Publication No. 2012-108872, there is a problem in that it is difficult to use the technology at card stunts, etc.

In view of the above-described circumstances, there is a need to allow each of a large number of information processing devices to output each part of the content in cooperation with the other information processing devices to create the complete content.

SUMMARY OF THE INVENTION

It is an object of the present invention to at least partially solve the problems in the conventional technology.

A collective output system includes an information processing device and a plurality of terminal devices. The information processing device includes: a content holding unit that holds content containing multiple elements in association with time information indicating timing to control output of the content; a map generation unit that generates a map that associates each piece of position information indicating each predetermined position in an area in which the content is output, with each of the elements of the content; a first reception unit that receives, from a terminal device, output position information indicating a position for outputting the content, the output position information conforming with the position information; an element acquisition unit that acquires, on the basis of the map, an element associated with the position information corresponding to the output position information and acquires the time information associated with the content containing the element; and a first transmission unit that transmits the element and the time information that are acquired by the element acquisition unit, to the terminal device from which the output position information is transmitted. Each of the terminal devices includes: a position information acquisition unit that acquires the output position information in the area; a second transmission unit that transmits the output position information to the information processing device; a second reception unit that receives the element and the time information that are transmitted from the information processing device according to the output position information transmitted from the second transmission unit; and an output unit that outputs the element at the timing indicated by the time information.

A collective output method is performed by an information processing device and a plurality of terminal devices. The method includes: holding, by the information processing device, content containing multiple elements in association with time information indicating timing to control output of the content; generating, by the information processing device, a map that associates each piece of position information indicating each predetermined position in an area in which the content is output, with each of the elements of the content; first acquiring, by a terminal device, output position information indicating a position for outputting the content in the area, the output position information conforming with the position information; first transmitting, by the terminal device, the output position information to the information processing device; first receiving, by the information processing device, the output position information from the terminal device; second acquiring, by the information processing device on the basis of the map, an element associated with the position information corresponding to the output position information and acquires the time information associated with the content containing the element; second transmitting, by the information processing device, the element and the time information that are acquired at the second acquiring, to the terminal device from which the output position information is transmitted; second receiving, by the terminal device, the element and the time information that are transmitted from the information processing device according to the output position information transmitted at the first transmitting; and outputting, by the terminal device, the element at the timing indicated by the time information.

A terminal device includes: a position information acquisition unit that acquires output position information indicating a position for outputting content; a transmission unit that transmits the output position information to an information processing device that holds content containing multiple elements in association with time information indicating timing to control output of the content and that generates a map that associates each piece of position information indicating each position in an area in which the content is output, with each of the elements of the content; a reception unit that receives the element and the time information that are transmitted from the information processing device according to the output position information transmitted from the transmission unit; and an output unit that outputs the element at the timing indicated by the time information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart of exemplary operations of the terminal device according to the first embodiment;

DETAILED DESCRIPTION OF THE PREFERRED EMBODIMENTS

Embodiments of a collective output system, a collective output method and a terminal device will be described in detail below with reference to the accompanying drawings.

First Embodiment

Figure 1:
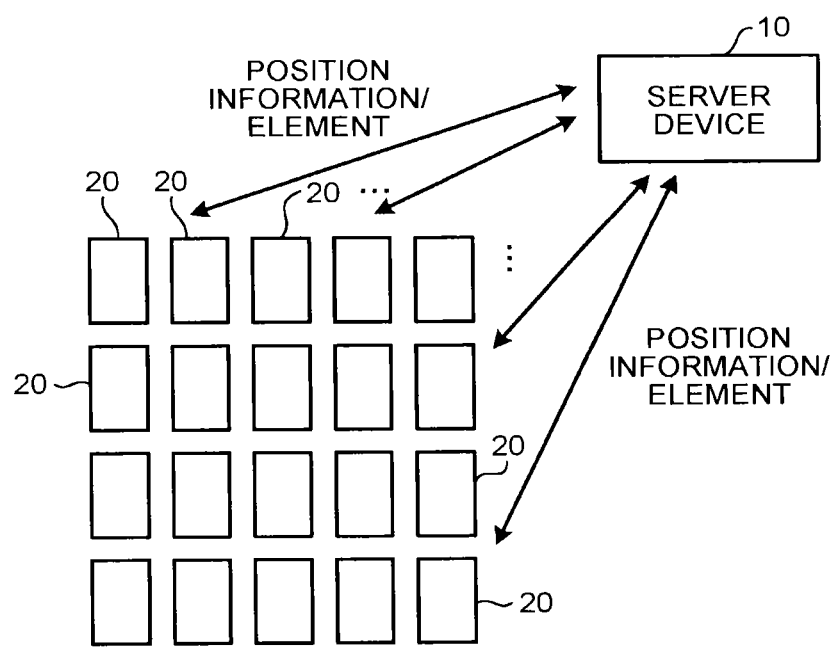
FIG. 1 schematically illustrates an exemplary configuration of a collective output system according to a first embodiment.

FIG. 1 schematically illustrates an exemplary configuration of a collective output system according to a first embodiment. As illustrated in FIG. 1, the collective output system includes a server device 10 and multiple terminal devices 20, 20 . . . that are communicable with the server device 10 via a network. The server device 10 includes at least one computer. The terminal device 20 is, for example, a smartphone or a tablet computer, includes a display, a camera, and a speaker, has a communication function, and can perform multiple functions such as telephone communications, sound play, acquisition of images by image capturing, and data communications.

In the collective output system, the server device 10 generates multiple elements of content to be output in respective given output positions on the basis of the content and transmits the elements with time information for controlling the timing to output the content to the terminal devices 20, 20, . . . that are arrayed in the respective given output positions. The terminal devices 20, 20, . . . output the respective elements, which are transmitted from the server device 10, according to the time information so that one whole content can be created from the outputs of the terminal devices 20, 20, . . . .

Each of the terminal devices 20, 20, . . . acquires output position information indicating the position in which the terminal device 20 should output the content and transmits the acquired output position information to the server device 10.

The server device 10 previously acquires content, such as an image. The content is not limited to a still image or a moving image. For example, the content may be multiple sounds or sounds that are played at multiple timings. Description will be given of an example in which the content acquired by the server device 10 is an image.

The server device 10 further acquires a position information group containing pieces of position information indicating the positions in each of which each of the terminal devices 20, 20, . . . is caused to output the content. On the basis of the content, the server device 10 generates elements each corresponding to each piece of position information contained in the position information group. When the content is an image, an element is, for example, an image of each of areas obtained by dividing the image according to each piece of position information contained in the position information group. When the content is a moving image, the element is, for example, an image of each field at a position corresponding to each of the areas obtained by dividing a frame of the moving image according to the pieces of position information contained in the position information group. Furthermore, each element is added with time information indicating the timing to control output of the element. More particularly, the time information indicates the time at which the element is to be output.

The server device 10 transmits a corresponding element to each of the terminal devices 20, 20, . . . in accordance with each piece of output position information that is transmitted from each of the terminal devices 20, 20, . . . . According to the control of a timer etc. each of the terminal devices 20, 20, . . . outputs the element that the terminal device 20 holds according to the time information that is added to the element. If the element is based on an image, the element is displayed on the display of the terminal device 20 at the timing according to the time information.

If the terminal devices 20, 20, . . . are arrayed in the positions that are acquired by the respective terminal devices 20, 20, . . . and that correspond to the output position information, the whole content can be output with the output of elements from the terminal devices 20, 20, . . . .

Figure 2A:
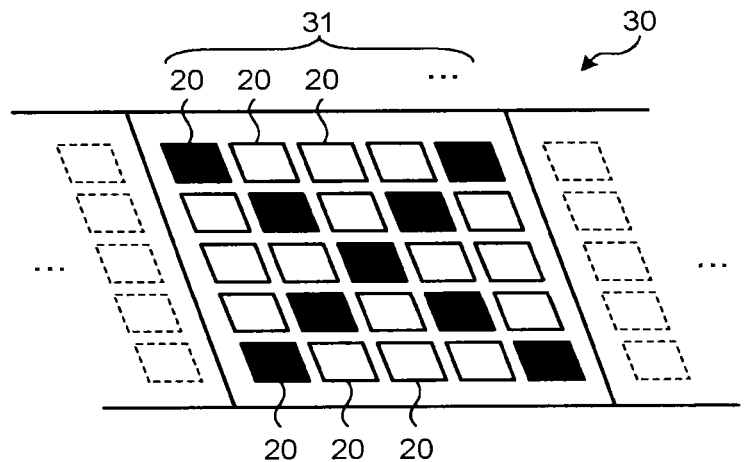
FIGS. 2A and 2C specifically illustrate an exemplary content output made by the collective output system according to the first embodiment.
Figure 2B:
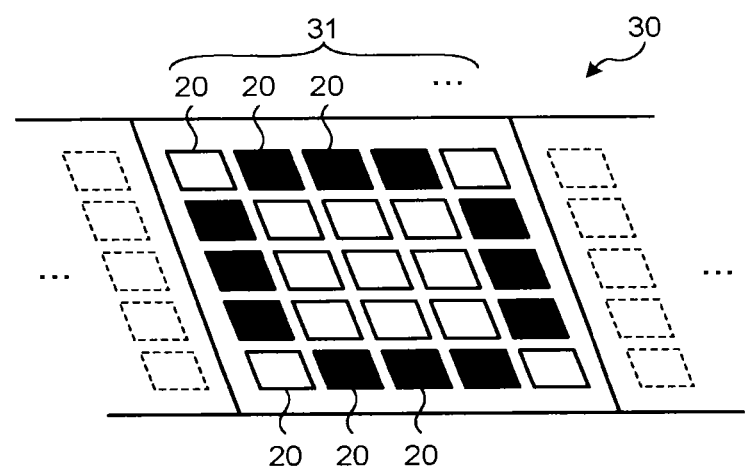
Figure 2C:
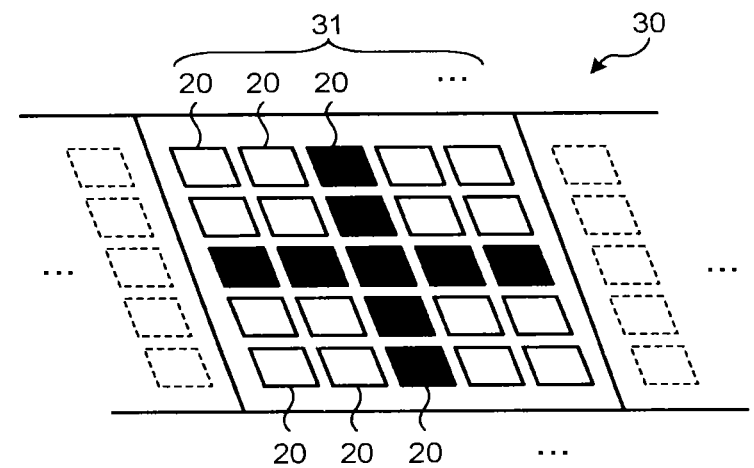

FIGS. 2A to 2C more specifically illustrate exemplary content output made by the collective output system according to the first embodiment. A case will be described below where the content is a moving image that is what is called a slide show in which multiple still images are switched and sequentially displayed at specified times. If the content is a moving image, an element contains each image of each filed that is contained in each of areas obtained by dividing the frame of the moving image. The time information that is added to the content contains at least one time that specifies a time to start outputting the moving image.

For example, the content is output in a given area 31 in a facility 30 shown in FIGS. 2A to 2C. Hereinafter, the area 31 is referred to as the target area 31. The server device 10 previously acquires the position information indicating each position in the target area 31 and identification information that identifies each position and stores the acquired position information and identification information in association with each other.

For example, if the facility 30 includes audience seats in a stadium or theatre, each position in the target area 31 corresponds to each seat. In the example of FIGS. 2A to 2C, seats are in an array of 5 rows×5 columns. In this case, the position information can correspond to the position where each seat is arrayed in the target area 31 and identification information can correspond to the seat number of each seat. The position information may be indicated with absolute coordinates or information that indicates the relative position with respect to a reference seat, for example.

The server device 10 generates each element corresponding to each piece of position information on the basis of the content. The server device 10 then creates a map that associates each generated element and identification information that is associated with position information corresponding to each element. Accordingly, the server device 10 can acquire the element corresponding to given identification information.

The terminal devise 20, 20, . . . shown in FIGS. 2A to 2C are arrayed in positions corresponding to the respective pieces of output position information that are acquired by the respective terminal devices 20, 20, . . . and previously acquire elements corresponding to the respective pieces of position information, i.e., identification information, from the server device 10. For example, each of the terminal devices 20, 20, . . . transmits its seat number as identification information to the server device 10. The server device 10 adds time information to an element corresponding to the position information associated with the transmitted seat number and transmits the element added with the time information to the terminal device 20 from which the seat number is transmitted.

FIG. 2A illustrates an example where the content output is started. From among the terminal devices 20, 20, . . . shown in FIG. 2A, the terminal devices 20 shown as blacked out display deep-color images, such as black images, on their displays in accordance with the elements and the terminal devices 20 that are shown as void display light-color images, such as white images, on their displays in accordance with the elements. The terminal devices 20, 20, . . . display the elements corresponding to the respective positions as described above so that the whole content (display of "x" in this case) is output.

In accordance with the time information that is added to the elements, each of the terminal devices 20, 20, . . . switches the element to be displayed on the display at the time that is indicated by the time information. FIG. 2B illustrates an example where the elements of the terminal devices 20, 20, . . . are switched. In the example of FIG. 2B, the displays of the terminal devices 20, 20, . . . are switched from the example of "x" in FIG. 2A in accordance with the elements so that the display of "x" in FIG. 2A is switched to the whole display of "○".

In accordance with the time information added to the elements, the terminal devices 20, 20, . . . further switch the elements to be displayed on their displays at the next timing. In this example, the display of "○" illustrated in FIG. 2B is switched to the whole display of "+".

According to the first embodiment, the terminal devices 20, 20, . . . display the respective elements, which are transmitted from the server device 10 according to the output position information, according to the time information added to the elements, thereby expressing the whole content. The terminal devices 20, 20, . . . switch the elements to be displayed according to the time information, thereby expressing the content of a moving image.

Figure 3:
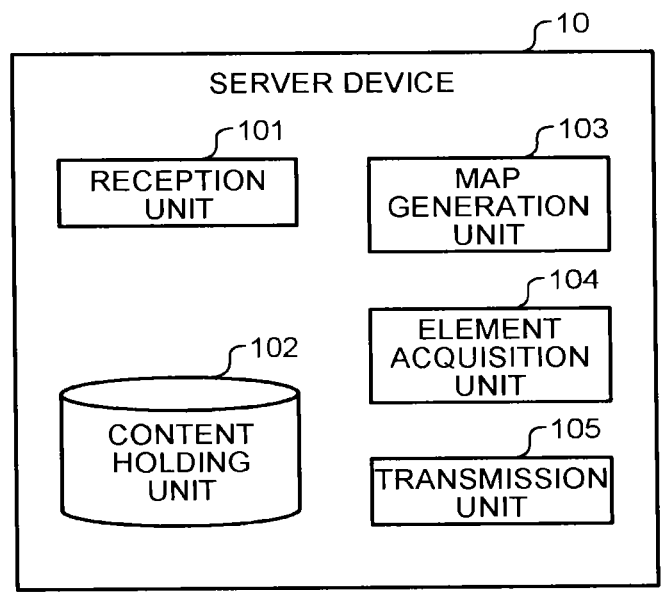
FIG. 3 is an exemplary functional block diagram illustrating functions of a server device according to the first embodiment.

FIG. 3 is an exemplary functional block diagram illustrating functions of the server device 10 according to the first embodiment. The server device 10 includes a reception unit 101, a content holding unit 102, a map generation unit 103, an element acquisition unit 104, and a transmission unit 105. The reception unit 101, the content holding unit 102, the map generation unit 103, the element acquisition unit 104, and the transmission unit 105 may be configured with a program that is run by a central processing unit (CPU) or may be entirely or partly configured with pieces of hardware that operate in cooperation with one another.

The reception unit 101 receives output position information that is transmitted from a terminal device 20 via the network. The content holding unit 102 holds the content to be expressed by the terminal devices 20, 20, . . . . The content holding unit 102 holds the time information indicating the time to output the held content in association with the content. The map generation unit 103 generates each element from the content on the basis of the position information indicating each position in an area in which the content held by the content holding unit 102 is output and generates a map that associates the position information and each generated element.

The element acquisition unit 104 refers to the map, which is generated by the map generation unit 103 on the basis of the output position information received by the reception unit 101, and acquires the element corresponding to the output position information. The element acquisition unit 104 acquires the position information corresponding to the identification information from the pre-created table that associates the identification information and position information. The element acquisition unit 104 then refers to the map in accordance with the acquired position information and acquires the element associated in the map.

The transmission unit 105 transmits the element that is acquired by the element acquisition unit 104 to the terminal device 20 that has transmitted the position information that corresponds to the element and that is received by the reception unit 101. Here, the transmission unit 105 adds time information associated with the content, which contains the element, to the element and transmits the element added with the time information.

Figure 4:
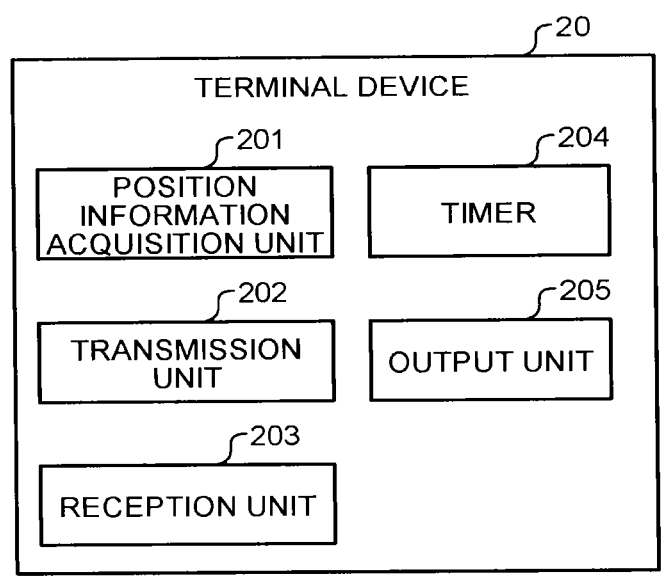
FIG. 4 is an exemplary functional block diagram illustrating functions of a terminal device according to the first embodiment.

FIG. 4 is an exemplary functional block diagram illustrating functions of the terminal device 20 according to the first embodiment. The terminal device 20 includes a position information acquisition unit 201, a transmission unit 202, a reception unit 203, a timer 204, and an output unit 205. The position information acquisition unit 201, the transmission unit 202, the reception unit 203, and the timer 204 may be configured with a program that is run by a central processing unit (CPU) or may be entirely or partly configured with pieces of hardware that operate in cooperation with one another.

The position information acquisition unit 201 acquires output position information indicating a position in which the terminal device 20 should output the content (element) that is acquired from the server device 10. The position information acquisition unit 201 may acquire identification information corresponding to the position as the output position information or may acquire information (such as coordinate information) that directly indicates the position as the output position information. Alternatively, the position information acquisition unit 201 may acquire output position information that is identification information, such as the seat number, directly input by a user's operation or, as described below, may acquire a captured image obtained by capturing an image of the identification information as the output position information.

The transmission unit 202 transmits the output position information that is acquired by the position information acquisition unit 201 to the server device 10. The reception unit 203 receives the element that is transmitted from the server device 10 according to the output position information that is transmitted from the transmission unit 202.

The timer 204 measures the time. The output unit 205 outputs the element that is received by the reception unit 203. The output unit 205 compares the time that is measured by the timer 204 and the time that is indicated by the time information added to the element and outputs the element at the timing indicated by the time information. If the element is based on an image, the output unit 205 outputs the element by displaying the element on the display of the terminal device 20. If the element is based on sound, the output unit 205 uses a sound output function of the terminal device 20 to output sound with, for example, a speaker, thereby outputting the element.

Figure 5:
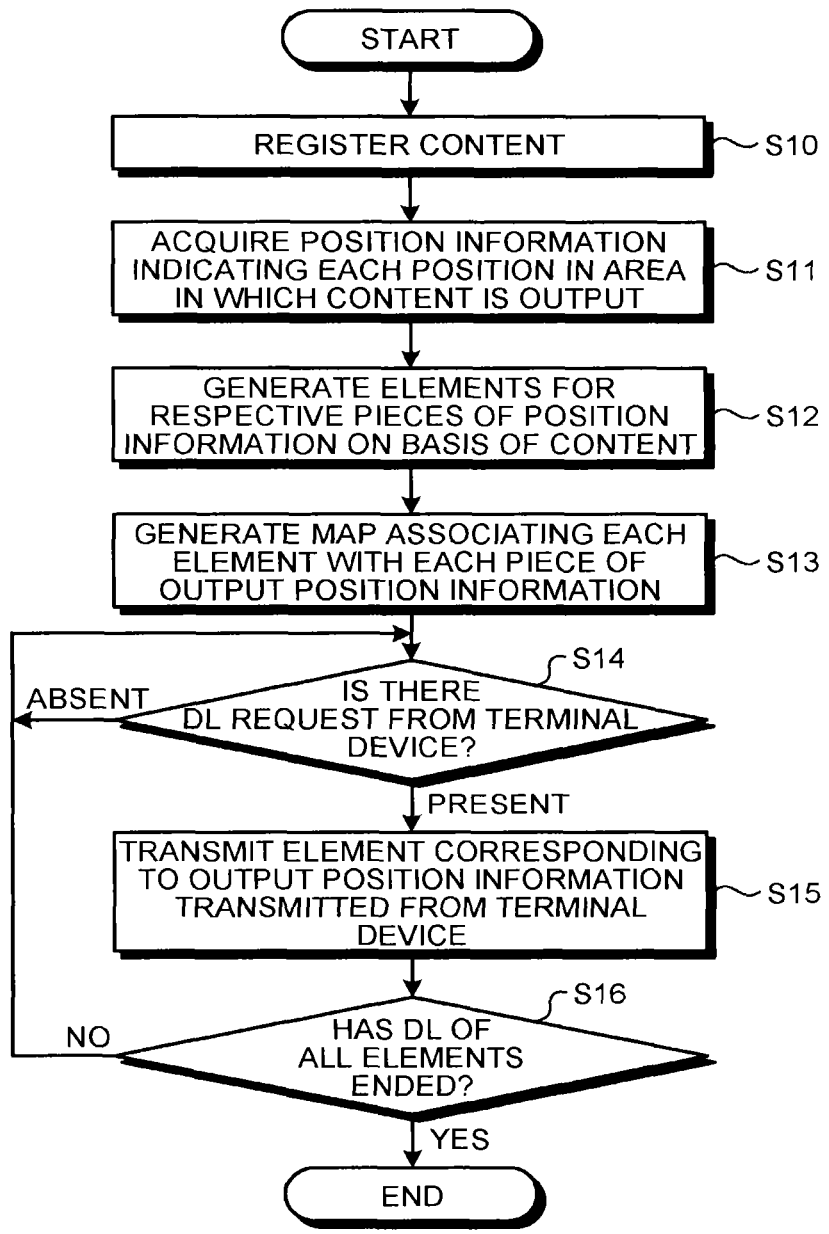
FIG. 5 is a flowchart of exemplary operations of the server device according to the first embodiment.

FIG. 5 is a flowchart of exemplary operations of the server device 10 according to the first embodiment. At step S10, the server device 10 stores the content that is acquired from the outside in the content holding unit 102 and registers the content. Here, the server device 10 also acquires time information indicating the timing to output the content and holds the time information in association with the content in the content holding unit 102. Here, the content is a moving image, i.e., slide show display.

Figure 6:
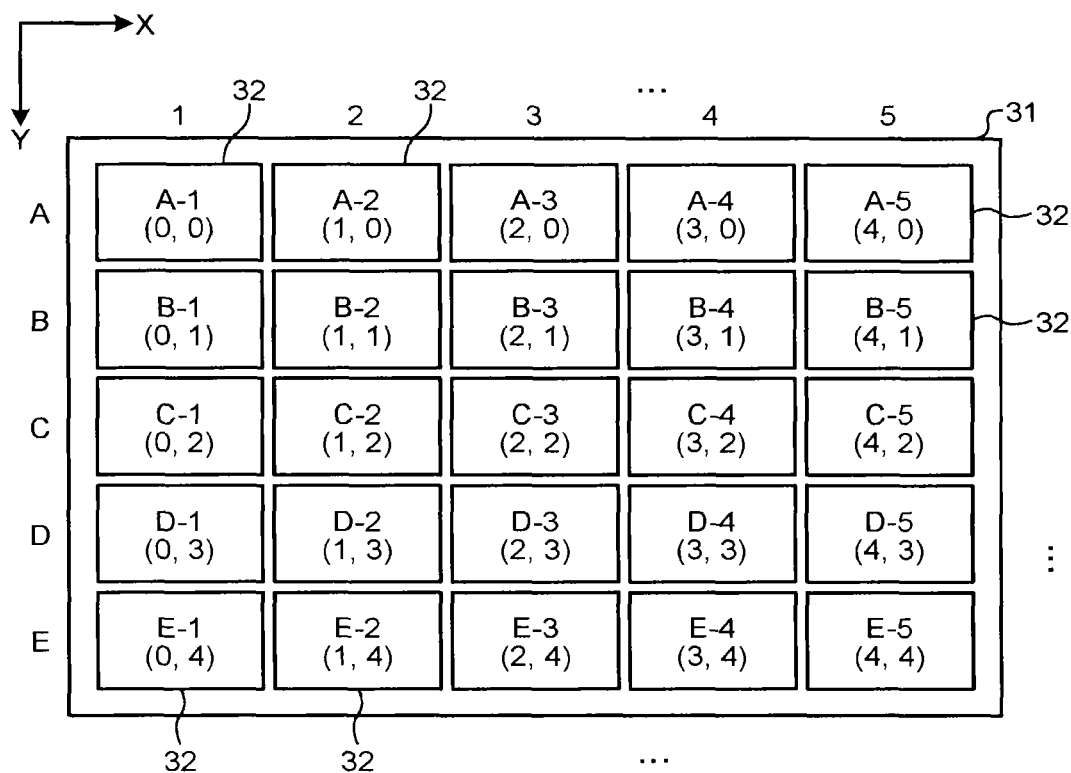
FIG. 6 illustrates position information according to the first embodiment.

At step S11, the map generation unit 103 of the server device 10 acquires each piece of position information indicating each position in the area in which the content that is registered at step S10 is output. The position information according to the first embodiment will be described with reference to FIG. 6. The target area 31 shown in FIG. 6 is a given area of, for example, audience seats in, for example, a stadium or theatre where seats 32, 32, . . . are arrayed in a matrix of 5 rows×5 columns. The seats 32, 32, . . . are allocated with seat numbers "1", "2", in the row direction and are allocated with the seat numbers "A", "B", . . . in the column direction. In other words, the seats 32, 32, are defined as "A-1", "B-2", "C-4" etc. The seat numbers are identification information that identifies the seats 32, 32, . . . .

For example, for the array of the seats 32, 32, . . . , an X coordinate is allocated to each row and a Y coordinate is allocated to each column. In the example of FIG. 6, for example, the position of the seat number "A-1" at the left end is allocated with the coordinates (0,0) and the position of the seat number "B-2" is allocated with the coordinates (1,1), and the position of the seat number "E-3" is allocated with the coordinates (2,4). In the first embodiment, the coordinates are used as the position information. The position information has been described as information indicating the relative position with respect to a seat 32 serving as a reference. Alternatively, for example, the position information may be information indicating an absolute position with, for example, the latitude and longitude.

Figure 7A:
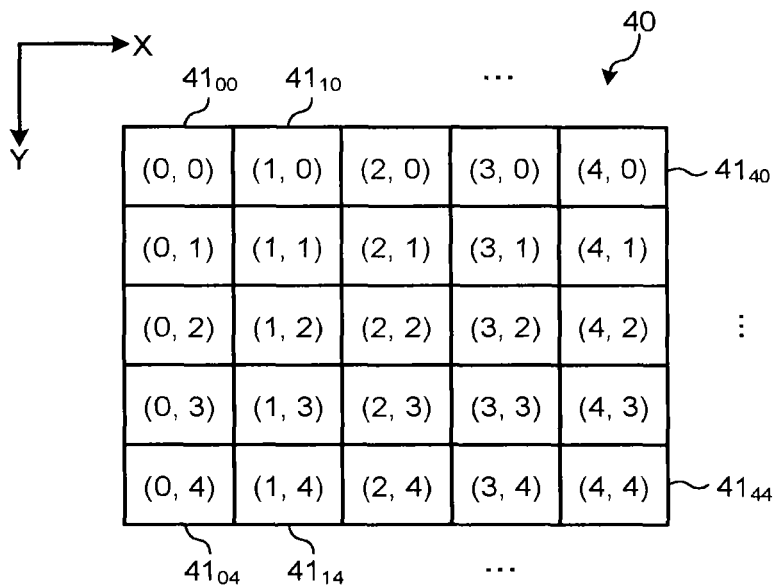
FIGS. 7A and 7B illustrate processing performed by a map generation unit according to the first embodiment.

At the subsequent step S12, the map generation unit 103 generates the elements for the respective pieces of position information on the basis of the content that is registered at step S10. As illustrated in FIG. 7A, the map generation unit 103 divides a frame 40 of a moving image, which is the content, according to the position information and generates divided areas $41_{00}$, $41_{10}$, . . . , $41_{40}$, . . . , $41_{04}$, . . . , $41_{14}$, . . . , and $41_{44}$. The images of areas at positions corresponding to the these respective divided areas $41_{00}$, $41_{10}$, . . . , $41_{40}$, . . . , $41_{04}$, . . . , $41_{14}$, . . . , and $41_{44}$ serve as the elements that constitute the content.

The map generation unit 103 allocates the coordinates (0,0), (1,0), . . . , (4,0), . . . , (0,4), . . . , (1,4), . . . , and (4,4) to the generated divided areas $41_{00}$, $41_{10}$, . . . , $41_{40}$, . . . , $41_{04}$, . . . , $41_{14}$, . . . , and $41_{44}$, respectively.

Figure 7B:
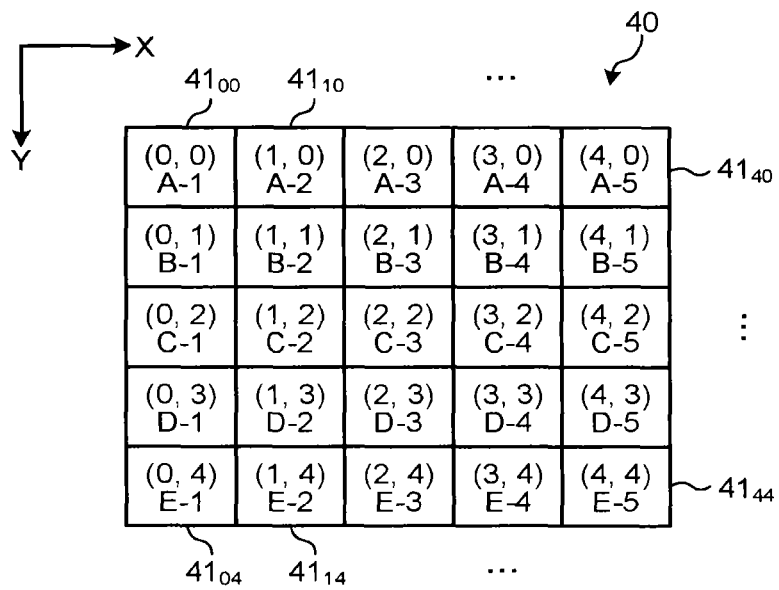

At the subsequent step S13, the map generation unit 103 generates a map that associates each element with the output position information. For example, as illustrated in FIG. 7B, the map generation unit 103 associates seat numbers allocated to the corresponding pieces of position information with respective sets of coordinates (0,0), (1,0), . . . , (4,0), . . . , (0,4), . . . , (1,4), . . . , and (4,4) to generate a map that associates each seat number with each element.

The exemplary process performed by the map generation unit 103 according to the first embodiment will be described more specifically. For example, a case will be considered here where, as illustrated in FIGS. 2A to 2C, the whole content display in the target area 31 changes in sequence in the following order: display of "x", display of "○", display of "+" . . . .

Figure 8:
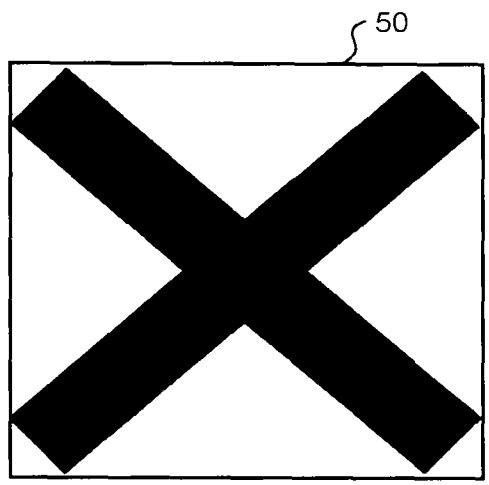
FIG. 8 more specifically illustrates exemplary processing performed by the map generation unit according to the first embodiment.
Figure 9:
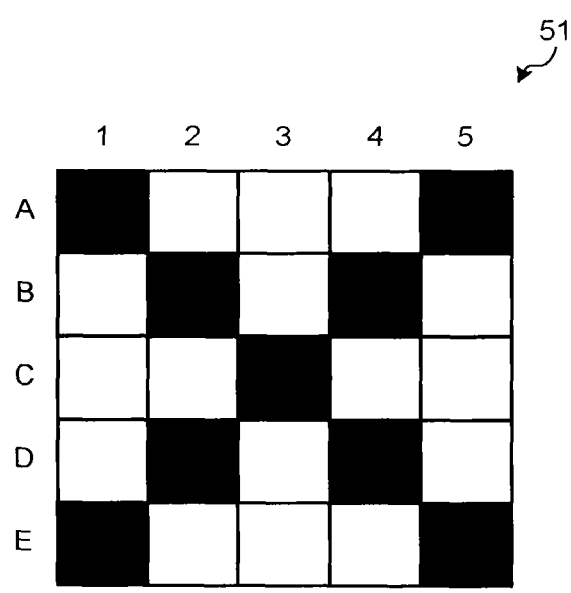
FIG. 9 more specifically illustrates the exemplary processing performed by the map generation unit according to the first embodiment.

For example, to display "x", the map generation unit 103 applies the divided areas $41_{00}$ to $41_{44}$ to an image 50 illustrated in FIG. 8. As a result, the image 50 is converted into an image 51 that consists of elements of the divided areas $41_{00}$ to $41_{44}$. The map generation unit 103 associates the elements with seat numbers "A-1" to "E-5" corresponding to the divided areas $41_{00}$ to $41_{44}$ to generate a map. By referring to the map in accordance with a seat number that is transmitted from a terminal device 20, the server device 10 can specify the element corresponding to the seat number.

Figure 10:
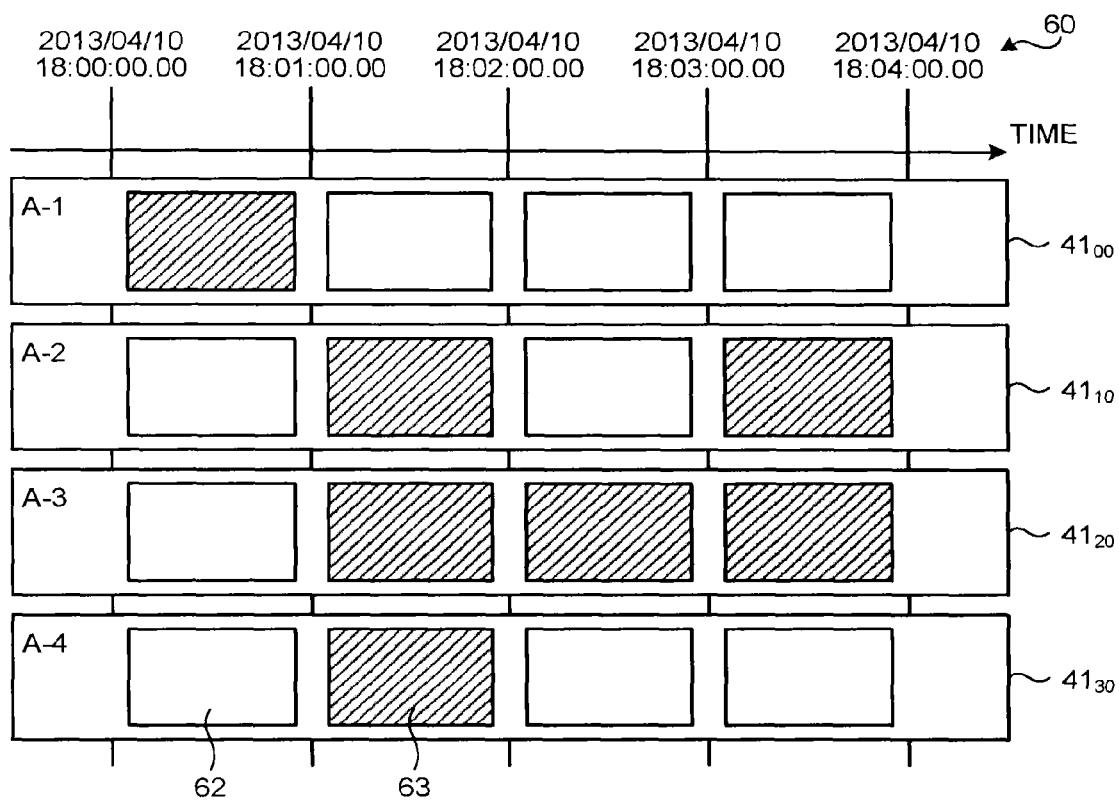
FIG. 10 more specifically illustrates the exemplary processing performed by the map generation unit according to the first embodiment.

The map generation unit 103 further associates each element with time information. FIG. 10 illustrates an exemplary association of each element with time information. Hatched elements 63 shown in FIG. 10 represent, for example, black images and void elements 62 represent, for example, white images. On the left end of each row in which elements are arrayed, each of seat numbers "A-1", "A-2" . . . is shown.

Time information 60 indicates the timings to switch each of the elements of the divided areas $41_{00}$ to $41_{30}$. In other words, FIG. 10 shows a play list representing the elements to be output according to the time for the divided areas $41_{00}$ to $41_{30}$. In the example of FIG. 10, the time information includes information indicating the time "18:00, Apr. 10, 2013", the time "18:01, Apr. 10, 2013", a time "18:02, Apr.

10, 2013", a time "18:03, Apr. 10, 2013", and, at the timings of each of the times, the elements are switched in the divided areas $41_{00}$ to $41_{30}$.

At the subsequent step S14, the server device 10 determines whether there is a request for downloading (DL) an element from a terminal device 20. When the server device 10 determines that there is no DL request from the terminal device 20, the process is returned to step S14. In contrast, when the reception unit 101 receives a DL request from a terminal device 20 and the server device 10 determines that there is an element DL request from the terminal device 20, the process proceeds to the subsequent step S15. The element DL request from the terminal device 20 contains output position information.

At step S15, the element acquisition unit 104 of the server device 10 refers to the map, which is generated at step S13, according to the output position information (e.g. a seat number) that is contained in the DL request from the terminal device 20, acquires the element corresponding to the output position information, and passes the element to the transmission unit 105. The transmission unit 105 adds time information to the element, which is passed from the element acquisition unit 104, and transmits the element added with the time information to the terminal device 20 from which the DL request is transmitted.

At the subsequent step S16, the server device 10 determines whether downloading of all the elements that constitute the content has completed. If determining that downloading of not all the elements has been completed, the server device 10 returns the process to step S14. If determining that downloading of all the elements has been completed, the server device 10 ends the series of processes of the flowchart of FIG. 5.

Alternatively, the server device 10 may determines whether a given time has come at step S16. For example, the server device 10 may close element DL at the latest time indicated by the time information corresponding to the content regardless whether DL of all the elements has completed. The server device 10 may further determine whether a given proportion of all the elements have been downloaded. Furthermore, the server device may combine determination on whether a given time has come and determination on whether a given proportion of all the elements have been downloaded.

FIG. 11 is a flowchart of exemplary operations of the terminal device 20 according to the first embodiment. At step S20, the position information acquisition unit 201 of the terminal device 20 acquires output position information indicating a position in which the content should be output. In this example where the target area 31 in which the content is output corresponds to audience seats, for example, seat numbers given to the seats can be used as the output position information.

Figure 12A:
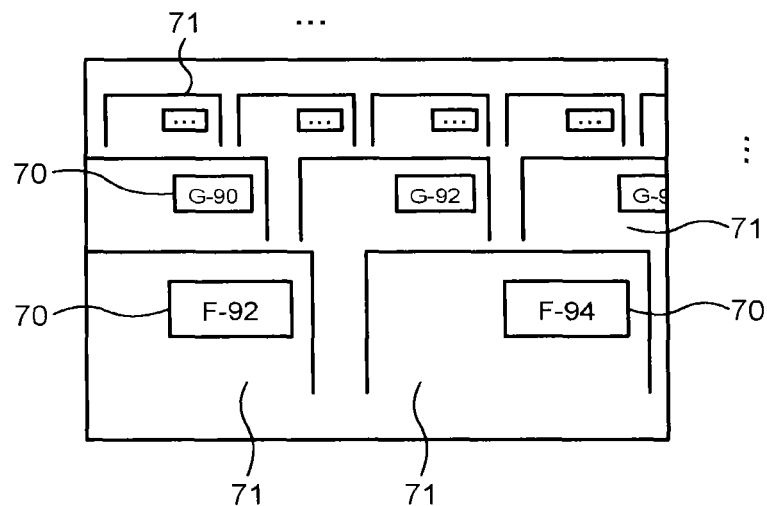
FIGS. 12A to 12C illustrates exemplary display of seat numbers.
Figure 12B:
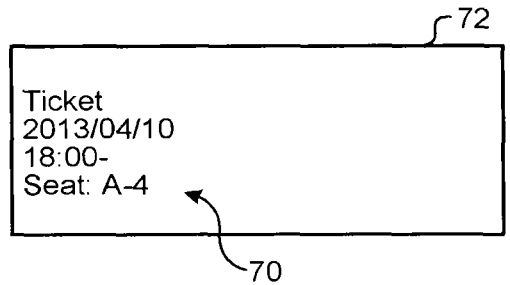

FIG. 12A illustrates an example where a seat number is directly displayed on each seat. For example, as illustrated in FIG. 12A, seat numbers 70, 70, . . . are displayed on plates that are provided in given positions on seats 71, 71, . . . , respectively, and presented to users. For example, for reserves seats, as illustrated in FIG. 12B, a seat number 70 is printed on a ticket 72 and presented to a user.

The position information acquisition unit 201 can acquire, as output position information, a seat number that is directly input to the terminal device 20 by, for example, a user's operation. Alternatively, the terminal device 2 may be provided with an image capturing unit that captures an image of an image capturing target and outputs the captured image, captures an image of a part where the seat number is presented with the image capturing unit, and acquire the seat number on the basis of the acquired captured image. In this case, optical character recognition (OCR) processing may be performed on the captured image to extract the seat number from the captured image.

Figure 12C:
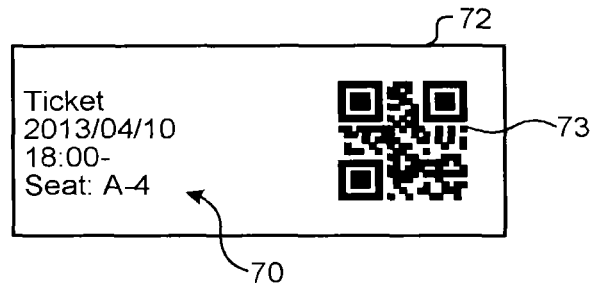

Alternatively, as illustrated in FIG. 12C, a seat number may be encoded to a matrix two-dimensional code 73, such as a QR code (trademark), and the matrix two-dimensional code 73 may be printed on the ticket 72. The user captures an image with the image capturing unit by operating the terminal device 20 and acquires the captured image that contains the matrix two-dimensional code 73 that contains the seat number. The position information acquisition unit 201 decodes the matrix two-dimensional code 73 to extract the seat number.

The following descriptions refer back to the flowchart of FIG. 11. At the subsequent step S21, the transmission unit 202 of the terminal device 20 transmits a DL request for requesting element DL to the server device 10. Here, the terminal device 20 adds the output position information, which is acquired at step S20, to the DL request and transmits the DL request added with the output position information. In response to the DL request transmitted from the terminal device 20, the server device 10 adds time information to the element corresponding to the output position information, which is added to the DL request, and transmits the element added with the time information to the terminal device 20 (steps S14 and S15 in FIG. 5).

At the subsequent step S22, the reception unit 203 receives the element that is transmitted from the server device 10 in response to the DL request, which is transmitted at step S21, and the time information that is added to the element. The received element is stored in the memory or storage of the terminal device 20. The received time information that is added to the element is passed to the output unit 205.

At the subsequent step S23, the output unit 205 refers to the current time information that is output from the timer 204 and determines whether the current time matches the time that is indicated by the time information that is added to the element. If determining that the current time does not match the time indicated by the time information, the output unit 205 performs the determination process at step S23 again. In contrast, if determining that the current time matches the time indicated by the time information added to the element, the process proceeds to step S24.

It is preferable that the timer 204 previously perform time adjustment on the basis of reference time information. The reference time information may be acquired by connecting the terminal device 20 to the Internet with network time protocols (NTP). Alternatively, the reference time information may be provided from the server device 10. In other words, the method of acquiring the reference time information is not limited as long as the current time information can be synchronized across the terminal devices 20, 20, . . . that output multiple elements that constitute the whole content.

At step S24, the output unit 205 outputs the element. In this example where the element is an image, the output unit 205 outputs the element by displaying an image on the display of the terminal device 20.

Even if the content is an image, elements are not limited to images. For example, if the content is an image, an element may be a command for displaying a color depending on position information. For example, a command that specifies the luminance of each of R (red), G (green), and B (blue) may be used as an element. The output unit 205 outputs the element by illuminating the display with the color according to the command.

At step S25, the output unit 205 determines whether output of elements at all the timings indicated by the time information has ended. If determining that there is any timing at which elements have not yet been output, the output unit 205 returns the process to step S23. In contrast, if determining that output of elements at all the timings indicated by the time information has ended, the output unit 205 ends the series of processes of the flowchart of FIG. 11.

The timings to perform the processes at steps S20 to S22 from acquiring of the output position information to receiving of elements are not particularly limited as long as they are before the latest time indicated by the time information. For example, if a seat number is input to a terminal device 20 by a user's operation or if a seat number is input to a terminal device on the basis of the image of the ticket 72, the terminal device 20 can be caused to perform the process at steps S20 to S22 before the user of the terminal device 20 arrives the position indicated by the output position information.

Furthermore, for example, the terminal device 20 may be caused to perform the process at steps S20 to S22 after the user of the terminal device 20 arrived the position indicated by the output position information.

A case has been described where the terminal devices 20, 20, . . . start outputting the elements simultaneously from the earliest time indicated by the time information but, practically, the terminal devices 20, 20, . . . cannot necessarily start outputting element simultaneously. For example, a case is conceivable where a user of a terminal device 20 arrives the position indicated by output position information behind the earliest time indicated by the time information. Another case can be considered where a terminal device 20 completes downloading of an element behind the earliest time indicated by the time information.

Figure 13:
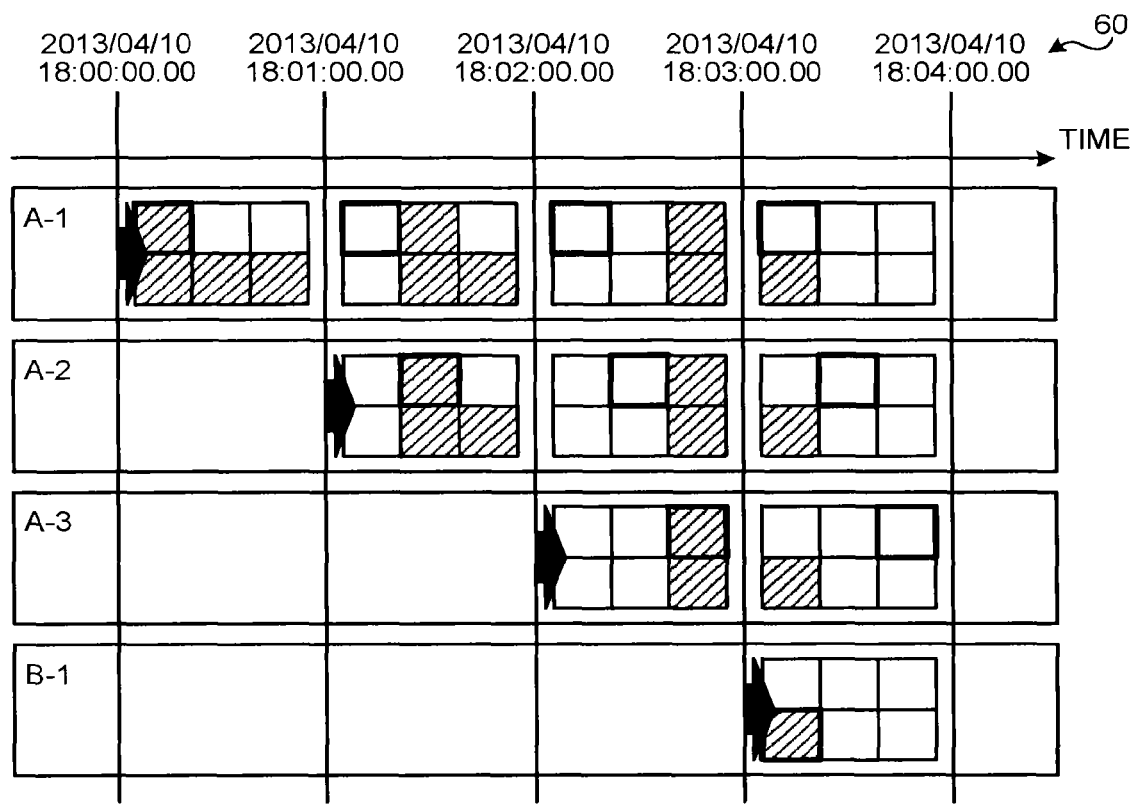
FIG. 13 illustrates an exemplary case where terminal devices do not start outputting elements simultaneously according to the first embodiment.

FIG. 13 illustrates an exemplary case where the terminal devices 20, 20, . . . do not start outputting elements simultaneously according to the first embodiment. In each of the rows of the seat numbers "A-1", "A-2", "A-3", and "B-1", each element output with output position information of each of the seat numbers "A-1" to "B-1" at each time indicated by the time information 60 is indicated by a thick bordered box.

In the output position for which the output position information is indicated with the seat number "A-1", outputting of elements is started at the earliest time "18:00, Apr. 10, 2013" indicated by the time information 60.

In the output positions indicated by other seat numbers "A-2", "A-3" and "B-1", outputting of elements is started behind the earliest time indicated by the time information 60. For example, in the output position indicated by the seat number "A-2", outputting of elements is started at the time "18:01, Apr. 10, 2013" that is second earliest indicated by the time information 60. Regarding the seat number "A-2", it is conceivable that downloading of an element from the server device 10 to the terminal device 20 completes between 18:00 and 18:01, Apr. 10, 2013. In such a case, as illustrated in step S24, the terminal device 20 waits the next time according to the time information and then outputs the element.

In this manner, each of the terminal devices 20, 20, . . . starts outputting elements at the nearest time, which is indicated by the time information, with respect to the current time after the time at which the element and time information are downloaded from the server device 10.

Figure 14:
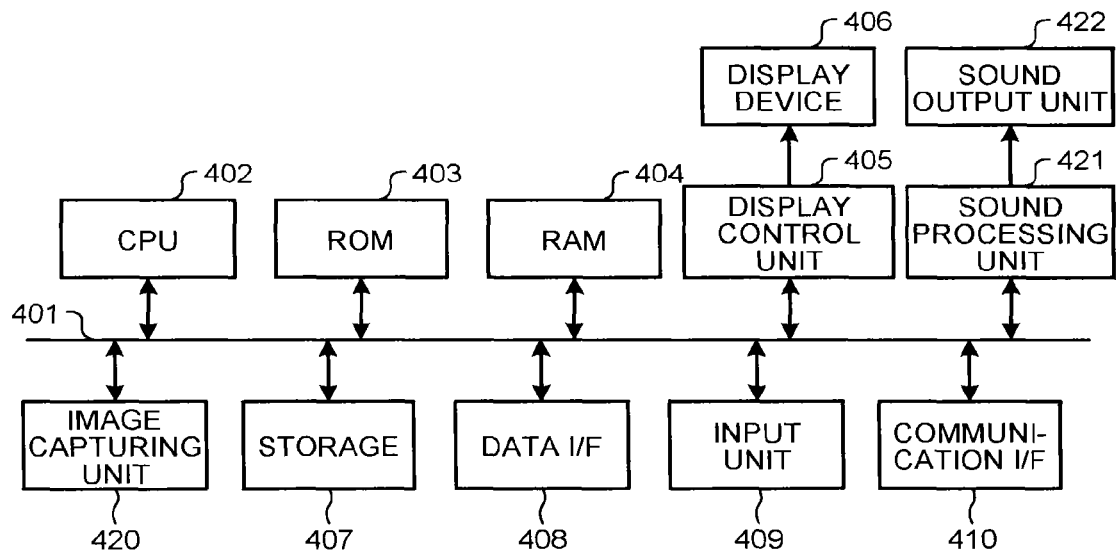
FIG. 14 is a block diagram of an exemplary configuration of the terminal device according to the first embodiment.

FIG. 14 illustrates an exemplary configuration of the terminal device 20 according to the first embodiment. As illustrated in FIG. 14, in the terminal device 20, a CPU 402, a ROM 403, a RAM 404, and a display control unit 405 are connected to a bus 401. Furthermore, a storage 407, a data I/F 408, an input unit 409, and a communication I/F 410 are connected to the bus 401. Furthermore, an image capturing unit 420 and a sound processing unit 421 are connected to the bus 401. FIG. 14 shows units of the terminal device 20 that are extracted as ones deeply concerned with the first embodiment and does not show the telephone communication function etc. that is not deeply concerned with the first embodiment directly.

The storage 407 is a storage medium that can store data even when not powered and is, for example, a non-volatile semiconductor memory, such as a flash memory. Alternatively, a hard disk drive may be used for the storage 407. The CPU 402 uses the RAM 404 as a work memory to control the whole terminal device 20 according to the programs stored in the ROM 403 and the storage 407. The display control unit 405 converts a display control signal that is generated by the CPU 402 to a signal that can be displayed by a display device 406 and outputs the signal.

The storage 407 stores the programs that are executed by the CPU 402 and various types of data. The data I/F 408 is used to input data from the outside. For the data I/F 408, an interface according to, for example, USB (universal serial bus) or IEEE1394 (Institute of Electrical and Electronics Engineering 1394) can be used.

The input unit 409 includes an input device that receives a user's input and outputs a given control signal. For example, the user can make an instruction to the terminal device 20 by operating the input device according to the display on the display device 406. It is preferable that the input device that receives user's inputs be configured integrally with the display device 406 and be configured as a touch panel that outputs a control signal corresponding to the pushed position and that transmits the image on the display device 406.

The communication I/F 410 allows communications with the network according to given protocols. The image capturing unit 420 includes an optical system, an image capturing device, and a control drive circuit for the optical system, and performs given processing on a signal from the image capturing device to output the processed signal as image data.

The image capturing unit 420 implements the image capturing function according to an instruction made by a user's operation on the input unit 409. The captured image obtained by the image capturing unit 420 is transmitted to the communication I/F 410 via, for example, the bus 401 and is transmitted to the server device 10 via the network according to an instruction from the CPU 402.

The sound processing unit 421 converts digital sound data to an analog sound signal. The sound processing unit 421 further performs sound quality correction processing, amplification processing, etc. on the sound signal and supplies the processed sound signal to the sound output unit 422. The sound output unit 422 is, for example, a speaker and outputs sound according to the sound signals supplied from the sound processing unit 421. Alternatively, the sound output unit 422 may output sound according to play control data, such as MIDI (Musical Instrument Digital Interface) data.

The position information acquisition unit 201, the transmission unit 202, the reception unit 203, the timer 204, and the output unit 205 are implemented with at least one program that is run by the CPU 402. The multiple programs are generally referred to as the "output program". The output program can be configured such that it can be stored in a computer that is connected to the network, can be downloaded and provided to the terminal devices 20. Alternatively, the output program may be configured to be provided or distributed via the network. Alternatively, whole or a part of the output program may be previously stored in the ROM 403 and provided.

Alternatively, the output program may be recorded in a computer-readable recording medium, such as a CD (Compact Disc) or a DVD (Digital Versatile Disk), in a file in an installable or executable format and provided. In this case, the output program that is recorded in the recording medium is supplied to, for example, a terminal device 20 via, for example, an external drive device that is connected to, for example, the data I/F 408. Alternatively, the output program that is recorded in the recording medium may be stored temporarily in an information processing device, such as a personal computer, and supplied to the terminal devices 20 via communications by the information processing device via the communication I/F 410 and the data I/F 408.

The output program is configured in a module configuration including the above-described units (the position information acquisition unit 201, the transmission unit 202, the reception unit 203, the timer 204, and the output unit 205). Regarding practical hardware, the CPU 402 reads the output program from, for example, the storage 407 and executes the output program so that the above-described units are loaded into the main storage device (e.g., the RAM 404) and generated in the main storage device.

Figure 15:
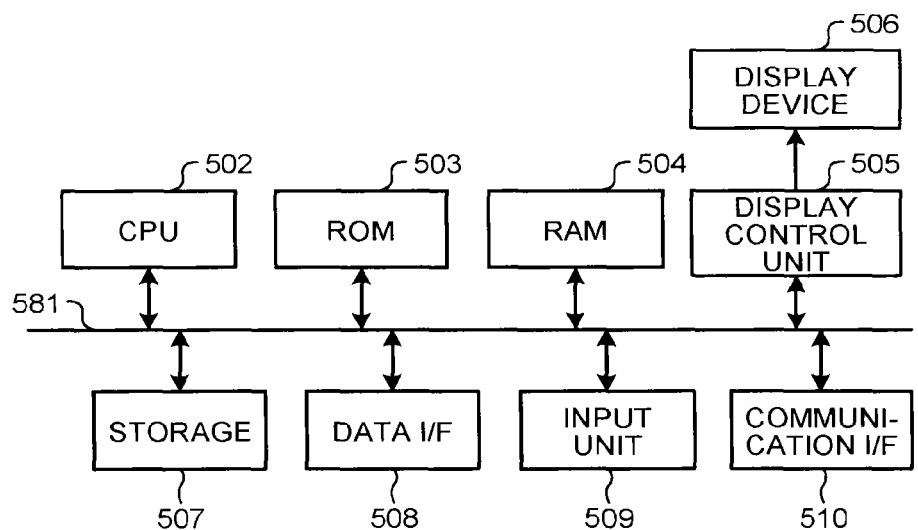
FIG. 15 is a block diagram of an exemplary configuration of the server device according to the first embodiment.

FIG. 15 illustrates an exemplary configuration of the server device 10 according to the first embodiment. As illustrated in FIG. 15, the server device 10 can employ a configuration of a general-use computer for a hardware configuration. In other words, in the server device 10 illustrated in FIG. 15, a CPU 502, a ROM 503, a RAM 504, a display control unit 505, a storage 507, a data I/F 508, an input unit 509, and a communication I/F 510 are connected to a bus 581.

The storage 507 is a storage medium that can store data even when not powered and is, for example, a hard disk drive. Alternatively, a non-volatile semiconductor memory, such as a flash memory, may be used for the storage 507. The CPU 502 uses the RAM 504 as a work memory to control the whole terminal device 20 according to the programs stored in the ROM 503 and the storage 507. The display control unit 505 converts a display control signal that is generated by the CPU 502 to a signal that can be displayed by a display device 506 and outputs the signal.

The storage 507 stores programs that are executed by the CPU 502 and various types of data. The data I/F 508 is an interface for inputting data from the outside. For the data I/F 508, for example, an interface according to, for example, USB or IEEE1394 can be used. The input unit 509 includes input devices, such as a keyboard and a mouse, that receive a user's input and outputs a given control signal. The communication I/F 510 communicates with the network according to given protocols.

The reception unit 101, the content holding unit 102, the map generation unit 103, the element acquisition unit 104, and the transmission unit 105 are implemented with at least one program that is run by the CPU 402. The content holding unit 102 stores the content that is held by the content holding unit 102 in, for example, the storage 407. The at least one program is generally referred to as the "server program". The server program may be supplied to the server device 10 via a network or may be recorded in a computer-readable recording medium, such as a CD or a DVD, in a file in an installable or executable format and supplied.

The server program is configured in a module configuration including the above-described units (The reception unit 101, the content holding unit 102, the map generation unit 103, the element acquisition unit 104, and the transmission unit 105). Regarding practical hardware, the CPU 502 reads the server program from, for example, the storage 507 and executes the server program so that the above-described units are loaded into the main storage device (e.g., the RAM 504) and generated in the main storage device.

A case has been described where the content is an image. Alternatively, the content may be sound. In such a case, each sound that is output in each position indicated by each piece of position information may be considered as an element of the content. Each sound may be at each different pitch in each group of positions grouped according to the given position information or may have different timbre in each group. Furthermore, each sound may be output at different time in each group. Furthermore, different pitch, different timbre, and different output time may be combined.

The server device 10 may allow the terminal devices 20, 20, . . . to download data for outputting sound in an audio data format in which sound was sampled. Alternatively, the server device 10 may allow the terminal devices 20, 20, . . . to download data for outputting sound as sound play control data, such as MIDI data. In such a case, the sound processing unit 421 generates a sound signal according to the sound play control data and supplies the sound signal to the sound output unit 422.

A case has been described where the server device 10 previously prepares an image that is used as content. Alternatively, for example, the server device 10 may use a user image that is provided from a user as an element that constitutes the content. For example, it is conceivable that an image of the face of a user is used as an element that constitutes the content. In this case, by controlling determination on whether to output the element based on the user image, the whole content can be output from the terminal devices 20, 20, . . . . The server device 10 can calculate an average of RGB values of the pixels of the user image, etc., and use the calculated values as the colors of the user image and as the element at an appropriate position in the content.

Furthermore, the server device 10 can reconstruct the content from the elements that have been output. For example, the server device 10 re-arrays the elements, which have been output at the specified timing, collectively in accordance with the output position information, thereby reconstructing the content. The server device 10 transmits the reconstructed content in response to a request from a terminal device 20 that has made the request. Accordingly, the user of the terminal device 20 can play and enjoy the content, for example, at home. In this case, the terminal device 20 can transmit, to the server device 10, the output position information with the request for the reconstructed content. Accordingly, the server device 10 can add information that specifies the positions of the elements, which are output by the terminal device 20, to the reconstructed content and transmits the content added with the information to the terminal device 20.

Furthermore, each of the terminal devices 20, 20, . . . can transmit a message to the server device 10 and output the content corresponding to the transmitted message. For example, once receiving a message from one of the terminal devices 20, 20, . . . , the server device 10 generates content to display the received message. On the basis of the generated content, the server device 10 generates each element according to the position information. The server device 10 transmits the generated elements to the respective terminal devices 20, 20, . . . according to the respective pieces of output position information that have been acquired from the respective terminal devices 20, 20, . . . . It is preferable that this transmission be made by push notification. Accordingly, the whole message from the user can be displayed by the terminal devices 20, 20, . . . .

Second Embodiment

A second embodiment will be described here. In the above-describe first embodiment, a method by OCR is employed as the method of extracting a seat number from a captured image. In the second embodiment, as the method of extracting a seat number from a captured image, an image search system for retrieving linkage information associated with an object contained in the image is employed. The image search system that can be applied to the second embodiment includes, for example, a database that stores objects and linkage information in association with each other. The image search system extracts an object that is contained in the transmitted captured image, retrieves linkage information that is associated with the extracted objet, and transmits the retrieved linkage information to the terminal device from which the captured image is transmitted.

Figure 16:
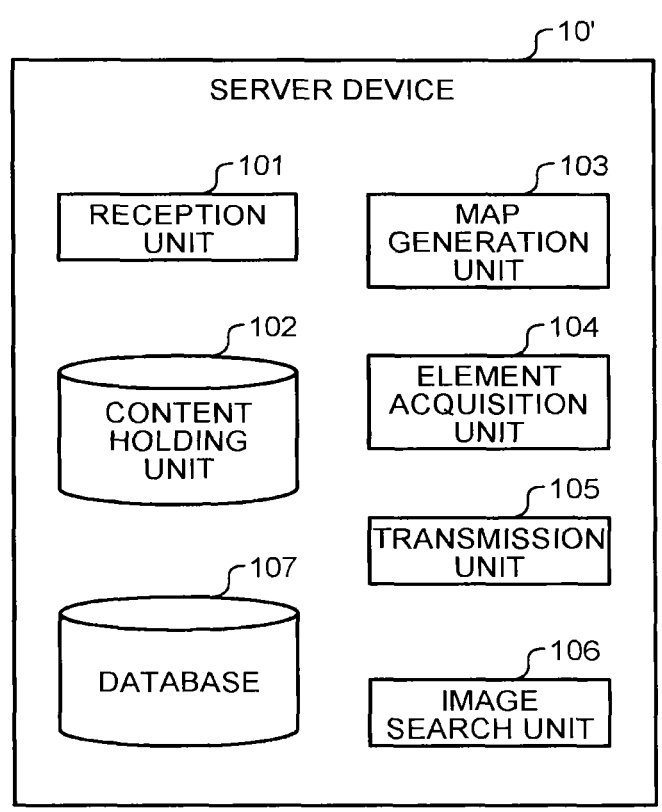
FIG. 16 is an exemplary functional block diagram of functions of a server device including an image search system, which is applicable to a second embodiment.

FIG. 16 is an exemplary functional block diagram of functions of a server device 10' that includes an image search system and that is applicable to the second embodiment. The components shown in FIG. 16 that are common with those shown in FIG. 3 are denoted by the same reference numerals as those of FIG. 3 and the detailed descriptions thereof will be omitted. The server device 10' shown in FIG. 16 has a configuration obtained by adding an image search unit 106 that implements the function of the image search system to the server device 10 shown in FIG. 3. The database 107 shown in FIG. 16 corresponds to the database that stores objects and linkage information in association with each other. In this example, the image search unit 106 and the database 107 are provided in the server device 10'. Alternatively, the image search unit 106 and the database 107 may be configured outside the server device 10'.

With reference to the flowcharts of FIGS. 5 and 11, exemplary operations of the server device 10' according to the second embodiment will be described here. Prior to the execution of the flowchart, in the database, images indicating seat numbers are previously registered as objects and seat numbers are previously associated as linkage information with the objects.

In accordance with steps S10 to S13 shown in FIG. 5, the server device 10' registers content, acquires position information, generates elements according to respective pieces of position information for the content, and generates a map that associates each element and each piece of output position information.

On the other hand, a user captures, with the image capturing unit of a terminal device 20, an image of a plate which is provided at the seat 70 and on which the seat number 70 is displayed or an image of an area including the seat number 70 that is printed on the ticket 72 (step S20 in FIG. 11). The terminal device 20 transmits the captured image with an element DL request to the server device 10' (step S21 in FIG. 11).

Upon receiving the element DL request and the captured image that are transmitted from the terminal device 20 (step S14 in FIG. 5), the server device 10' extracts, with its image search unit 106, the object from the captured image, which is transmitted from the terminal device 20, refers to the database 107, and acquires the seat number that is associated with the object. The image search unit 106 then passes the acquired seat number as output position information for the terminal device 20, from which the captured image is transmitted, to the element acquisition unit 104.

The element acquisition unit 104 refers to the map that is generated by the map generation unit 103 according to the output position information that is passed from the image search unit 106, acquires the element corresponding to the output position information, and passes the element to the terminal device 20 from which the DL request is transmitted (step S15 in FIG. 5). The process performed by the server device 10 after step S15 is the same as that of steps after S15 in FIG. 5 and thus the same descriptions will be omitted here.

The terminal device 20 receives the element that is transmitted from the transmission unit 105 of the server device 10' (step S22 in FIG. 11). The subsequent process performed by the terminal device 20 is the same as that after step S22 in FIG. 11 and thus the same descriptions will be omitted here.

As described above, according to the second embodiment, the element corresponding to the terminal device 20 can be acquired by only transmitting the captured image to the server device 10' without the OCR processing performed by the terminal device 20.

According to an aspect of the present invention, each of a large number of information processing devices can output each part of the content in cooperation with the other information processing devices to create the complete content.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A collective output system comprising an information processing device and a plurality of terminal devices,
the information processing device including at least one processor configured to:
hold plural sets of display control data, each set of the display control data for displaying respectively one of multiple elements of content and is associated respectively with one of plural pieces of position information indicating one of plural seats in an area in which the content is output;
receive, from a terminal device, output position information of the terminal device for specifying one of the seats in the area;
acquire one of the plural sets of the display control data of one element associated with the position information corresponding to the received output position information in response to receiving the output position information; and
control to distribute each of the plural sets of the display control data to the plurality of the terminal devices corresponding respectively to the position information and control to display, based on the distributed plural sets of the display control data, the multiple elements by the plurality of the terminal devices simultaneously for generating the content,
each of the terminal devices including:
a display; and
at least one processor configured to
acquire the output position information in the area;
transmit the output position information to the information processing device;
receive the display control data associated with the position information corresponding to the transmitted output position information; and
display the element on the display based on the received display control data,
the at least one processor of the information processing device holds the content to be represented in the area,
the at least one processor of the information processing device is further configured to generate the multiple elements and map information that associates each piece of the position information with each of the multiple elements based on the content and the area,
the terminal device further includes a camera that captures an image of an image capturing target,
the at least one processor of the terminal device transmits the captured image obtained by capturing, with the camera, the image capturing target that contains the output position information, to the information processing device, and
the at least one processor of the information processing device is further configured to
store the image containing the output position information in association with the position information;
retrieve, on the basis of the image containing the output position information contained in the received captured image, the position information associated with the image containing the output position information; and
acquire the element associated with the retrieved position information on the basis of the map information.

2. The collective output system according to claim 1, wherein the at least one processor of the information processing device holds the plural sets of the display control data, each of the sets of the display control data including a color designation for displaying the element with a color designated by the color designation.

3. The collective output system according to claim 2, wherein the at least one processor of the information processing device holds the plural sets of the display control data, each of the sets of the display control data including time information for controlling a timing of displaying the one of multiple elements of content to display the multiple elements simultaneously by the plurality of terminal devices.

4. The collective output system according to claim 1, wherein the at least one processor of the information processing device holds a plurality of images, each of the images being sent from one of the plurality of the terminal devices and included in one of the multiple elements respectively.

5. The collective output system according to claim 1, wherein
the at least one processor of the information processing device holds plural sets of output control data including the display control data and sound control data for outputting the display and a sound, and
the at least one processor of each of the terminal devices displays the element on the display and outputs sound by a speaker based on the output control data.

6. The collective output system according to claim 1, wherein the at least one processor of the information processing device collectively outputs the elements contained in the content at specified timing.

7. A collective output method performed by an information processing device and a plurality of terminal devices, the method comprising:
holding, by the information processing device, plural sets of display control data, each set of the display control data for displaying respectively one of multiple elements of content and is associated respectively with one of plural pieces of position information indicating one of plural seats in an area in which the content is output;
first acquiring, by a terminal device, output position information specifying one of the seats in the area, the output position information conforming with the position information;
first transmitting, by the terminal device, output position information to the information processing device;
first receiving, by the information processing device, the output position information from the terminal device;
second acquiring, by the information processing device, one of the plural sets of the display control data of one element associated with the position information corresponding to the output position information in response to the information processing device receiving the output position information;
second receiving, by the terminal device, the display control data associated with the position information corresponding to the output position information transmitted at the first transmitting; and
displaying, by the terminal device, the element on a display based on the received display control data, the holding includes holding the content to be represented in the area, and the collective output method further includes generating the multiple elements and map information that associates each piece of the position information with each of the multiple elements based on the content and the area, the method further comprising capturing, by the terminal device, an image of an image capturing target, the captured image obtained by capturing, at the capturing, the image capturing target that contains output position information, is transmitted to the information processing device at the first transmitting, and the method further comprising storing, by the information processing device, the image containing the output position information in association with the position information; and retrieving, by the information processing device on the basis of the image containing the output position information contained in the captured image received at the first receiving, the position information associated with the image containing the output position information, and the element associated with the position information, which is retrieved at the retrieving, is acquired on the basis of the map information at the second acquiring.

8. The collective output method according to claim 7, wherein the holding includes holding the plural sets of the display control data, each of the sets of the display control data including a color designation for displaying the element with a color designated by the color designation.

9. The collective output method according to claim 8, wherein the holding includes holding the plural sets of the display control data, each of the sets of the display control data including time information for controlling a timing of displaying the one of multiple elements of content to display the multiple elements simultaneously by the plurality of terminal devices.

10. The collective output method according to claim 7, wherein the holding includes holding a plurality of images, each of the images being sent from one of the plurality of the terminal devices and included in one of the multiple elements respectively.

11. The collective output method according to claim 7, wherein the holding includes holding plural sets of output control data including the display control data and sound control data for outputting the display and a sound, and the collective output method further comprising displaying the element on the display and outputting sound by a speaker based on the output control data.

12. The collective output method according to claim 7, further comprising collectively outputting the elements contained in the content at specified timing.

13. An information processing device in communication with a plurality of terminal devices, the information processing device comprising:

at least one processor configured to:

hold plural sets of display control data, each set of the display control data for displaying respectively one of multiple elements of content and is associated respectively with one of plural pieces of position information indicating one of plural seats in an area in which the content is output;

receive, from a terminal device, output position information of the terminal device for specifying one of the seats in the area;

acquire one of the plural sets of the display control data of one element associated with the position information corresponding to the received output position information in response to receiving the output position information; and control to distribute each of the plural sets of the display control data to the plurality of the terminal devices corresponding respectively to the position information and control to display, based on the distributed plural sets of the display control data, the multiple elements by the plurality of the terminal devices simultaneously for generating the content, the at least one processor of the information processing device holds the content to be represented in the area, the at least one processor of the information processing device is further configured to generate the multiple elements and map information that associates each piece of the position information with each of the multiple elements based on the content and the area, the terminal device further includes a camera that captures an image of an image capturing target, the at least one processor of the terminal device transmits the captured image obtained by capturing, with the camera, the image capturing target that contains the output position information, to the information processing device, and the at least one processor of the information processing device is further configured to store the image containing the output position information in association with the position information;

retrieve, on the basis of the image containing the output position information contained in the received captured image, the position information associated with the image containing the output position information; and acquire the element associated with the retrieved position information on the basis of the map information.

14. A collective output method performed by an information processing system, the method comprising:

receiving output position information from a terminal device, the output position information specifying one of plural seat in an area in which content is to be output;

acquiring one of plural sets of display control data, the acquired display control data associated with position information corresponding to the output position information in response to receiving the output position information, each of the plural sets of display control data being for displaying respectively one of multiple elements of the content and being associated respectively with one of plural pieces of position information; and transmitting, to the terminal device, the acquired display control data associated with the position information corresponding to the received output position information, holding the content to be represented in the area, and the collective output method further includes generating the multiple elements and map information that associates each piece of the position information with each of the multiple elements based on the content and the area, the method further comprising capturing, by the terminal device, an image of an image capturing target, the captured image obtained by capturing, at the capturing, the image capturing target that contains output position information, is transmitted to the information processing system at the transmitting, and the method further comprising
- storing, by the information processing system, the image containing the output position information in association with the position information; and
- retrieving, by the information processing system on the basis of the image containing the output position information contained in the captured image received at the receiving, the position information associated with the image containing the output position information, and
- the element associated with the position information, which is retrieved at the retrieving, is acquired on the basis of the map information at the acquiring.

15. A collective output method performed by a terminal device, the method comprising:
- acquiring output position information specifying one of plural seats in an area in which content is to be output;
- transmitting, to an information processing system, the output position information;
- receiving, from the information processing system, one of plural sets of display control data, the received display control data associated with the position information corresponding to the transmitted output position information, each of the plural sets of display control data being for displaying respectively one of multiple elements of the content and being associated respectively with one of plural pieces of position information; and
- displaying an element controlled to be displayed by the received display control data, holding the content to be represented in the area, and the collective output method further includes
- generating the multiple elements and map information that associates each piece of the position information with each of the multiple elements based on the content and the area, the method further comprising capturing, by the terminal device, an image of an image capturing target, the captured image obtained by capturing, at the capturing, the image capturing target that contains output position information, is transmitted to the information processing system at the transmitting, and the method further comprising
- storing, by the information processing system, the image containing the output position information in association with the position information; and
- retrieving, by the information processing system on the basis of the image containing the output position information contained in the captured image received at the receiving, the position information associated with the image containing the output position information, and
- the element associated with the position information, which is retrieved at the retrieving, is acquired on the basis of the map information at the acquiring.

* * * * *